F. L. O. WADSWORTH.
METHOD OF MANIPULATING GLASS AND SIMILAR SUBSTANCES.
APPLICATION FILED FEB. 26, 1913.

1,334,725.

Patented Mar. 23, 1920.
4 SHEETS—SHEET 2.

Witnesses
Frank A. Pahl
Josephine Gasper

Inventor
Frank L. O. Wadsworth,
By Arthur M. Hood
Attorney

F. L. O. WADSWORTH.
METHOD OF MANIPULATING GLASS AND SIMILAR SUBSTANCES.
APPLICATION FILED FEB. 26, 1913.

1,334,725.

Patented Mar. 23, 1920.
4 SHEETS—SHEET 3.

Witnesses
Frank A. Fahle
Josephine Gasper

Inventor
Frank L. O. Wadsworth,
By Arthur M. Hood
Attorney

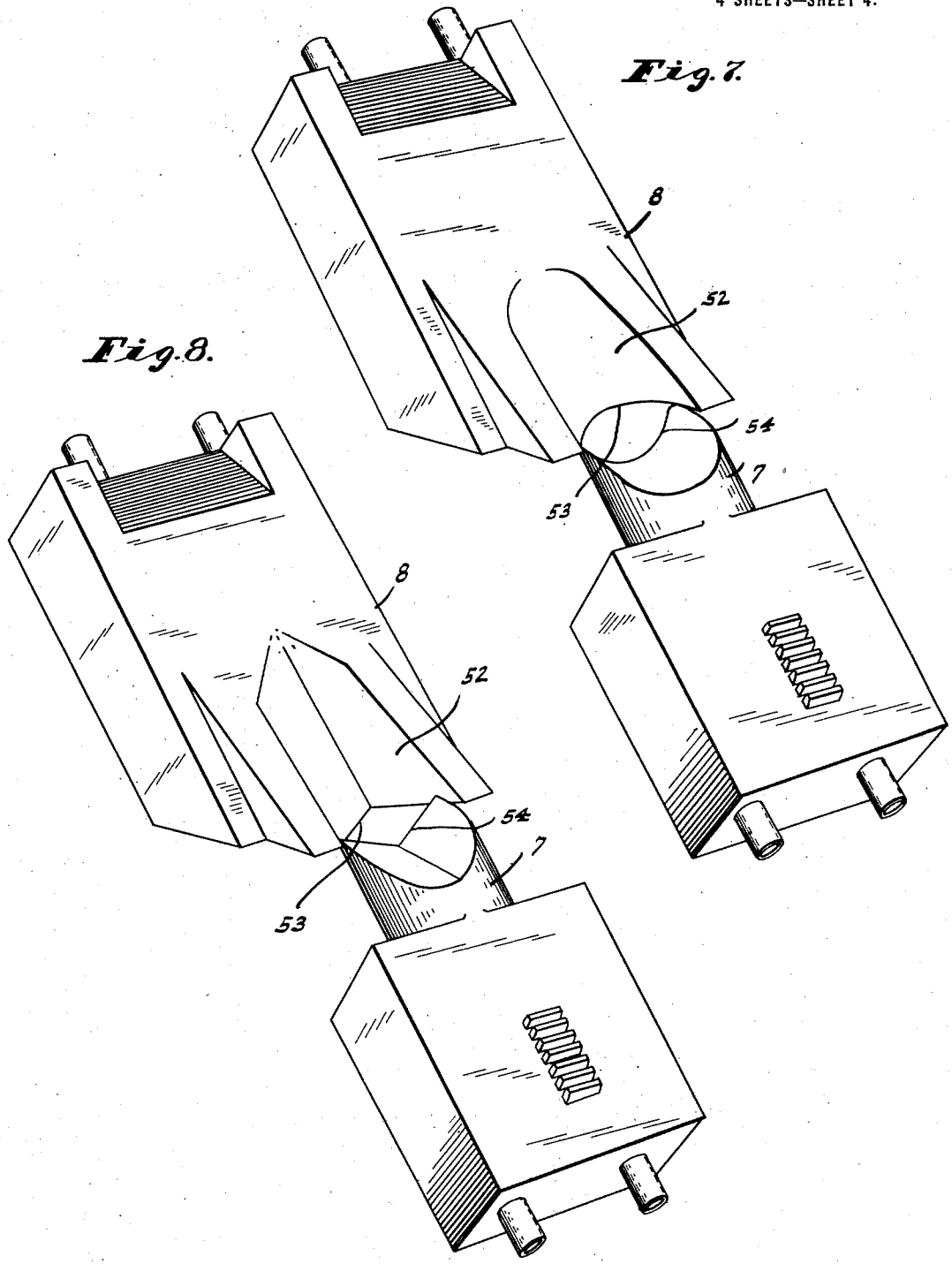

UNITED STATES PATENT OFFICE.

FRANK L. O. WADSWORTH, OF PITTSBURGH, PENNSYLVANIA, ASSIGNOR TO BALL BROTHERS GLASS MANUFACTURING COMPANY, OF MUNCIE, INDIANA, A CORPORATION OF INDIANA.

METHOD OF MANIPULATING GLASS AND SIMILAR SUBSTANCES.

1,334,725.      Specification of Letters Patent.      Patented Mar. 23, 1920.

Application filed February 26, 1913. Serial No. 750,810.

*To all whom it may concern:*

Be it known that I, FRANK L. O. WADSWORTH, a citizen of the United States, residing at Pittsburgh, in the county of Allegheny and State of Pennsylvania, have invented a new and useful Method of Manipulating Glass and Similar Substances, of which the following is a specification.

My invention relates to improvements in the art of working glass and similar substances by cutting out a series of individual batches from a large mass of the molten material maintained in a furnace or other source of supply, and delivering them in succession to a series of molds or other receptacles in which each separate molten batch may be subjected to pressing or blowing or other forming operations. The particular objects of my improvement are to greatly increase the speed with which such operations may be carried on and to improve the quality of the product produced as a result of the operations. To this end my improvements are directed; first, to the delivery of the glass to the cut off and mold supply apparatus at the lowest temperature at which the material can be properly manipulated or worked in subsequent operations; second, to the avoidance as far as possible of any "lapping" or chilling of the portions of the glass individually cut off or segregated from the main source of supply of the molten material; third, to the quick removal or delivery of the individually segregated "batches" or molten masses in the mold receptacles to the molding or forming mechanism; and, fourth, to the provision of means and mechanism which are particularly adapted to the accomplishment of the above objects and the advantages of which will be more specifically referred to in connection with the following description.

Figure 1:
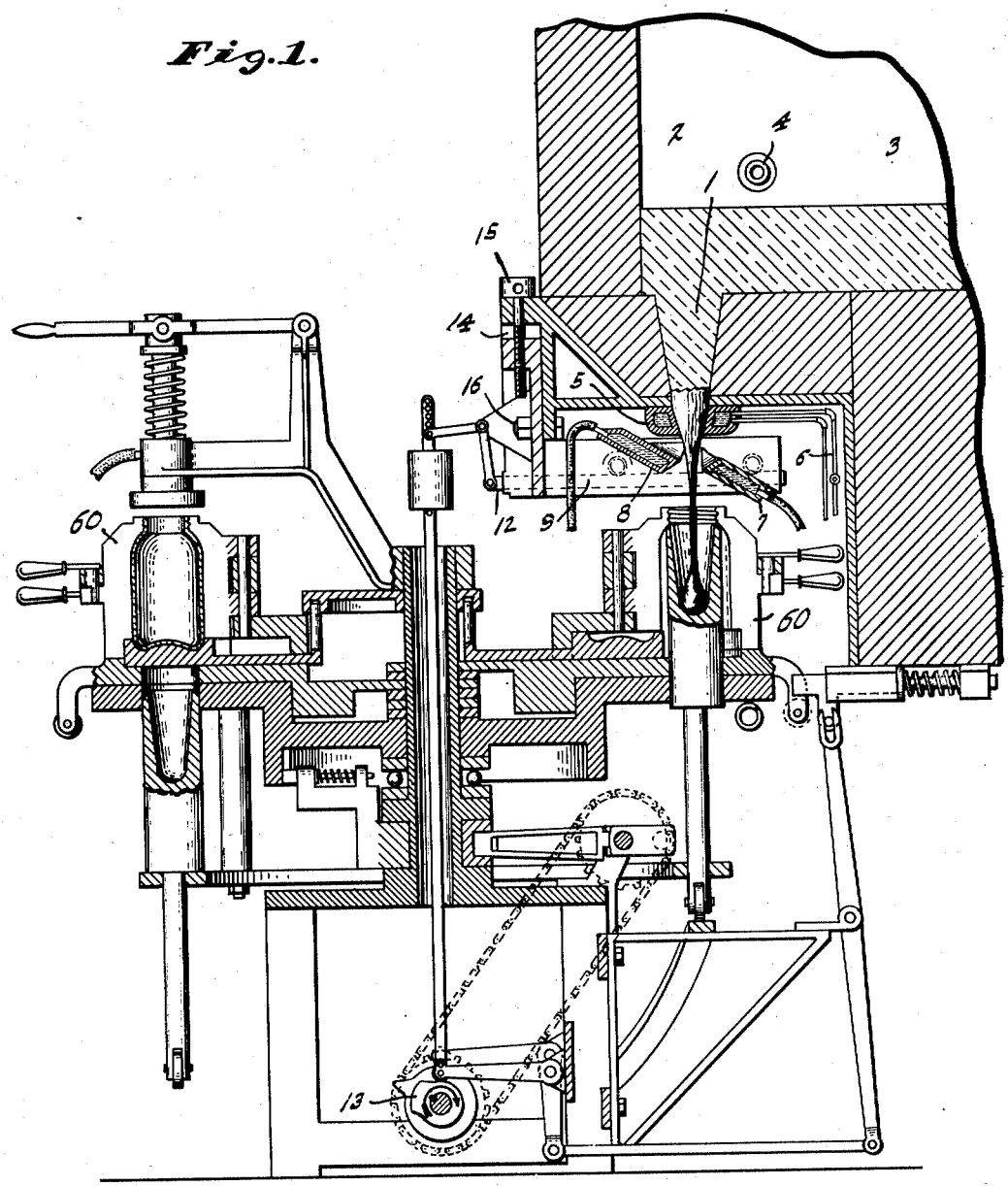
Figure 2:
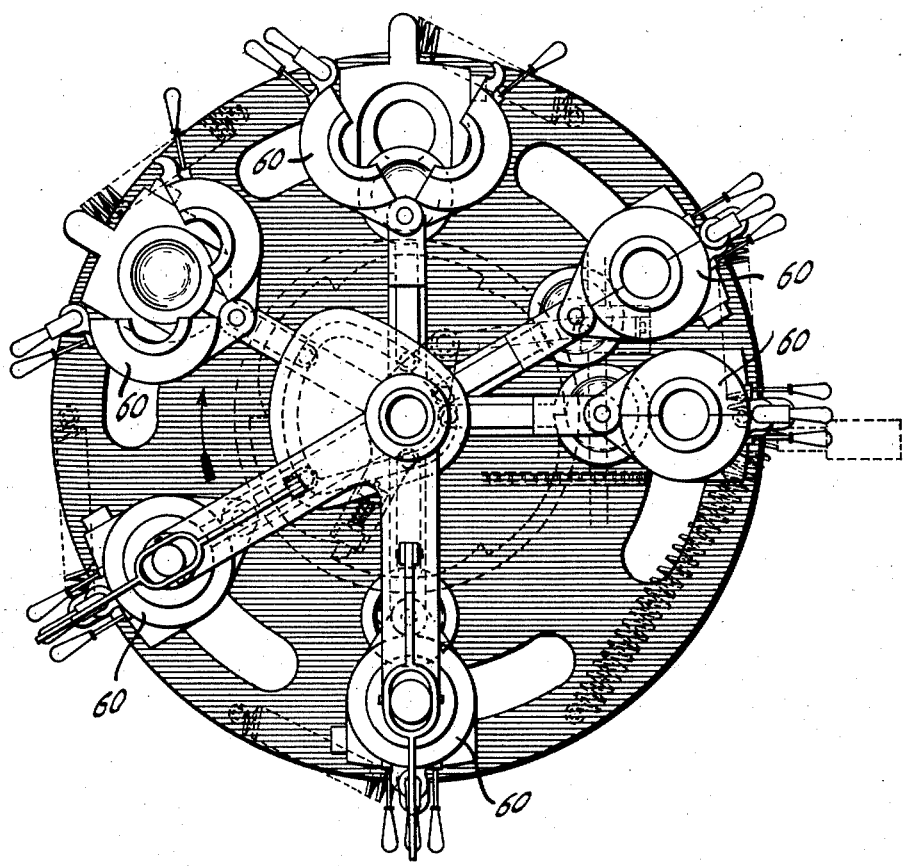
Figure 3:
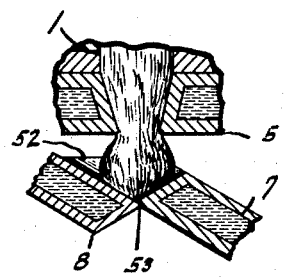
Figure 4:
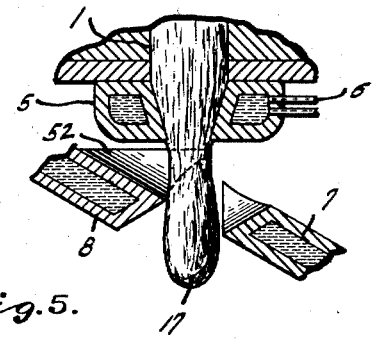
Figure 5:
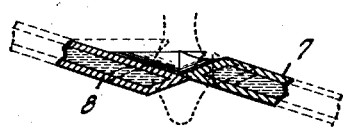
Figure 6:
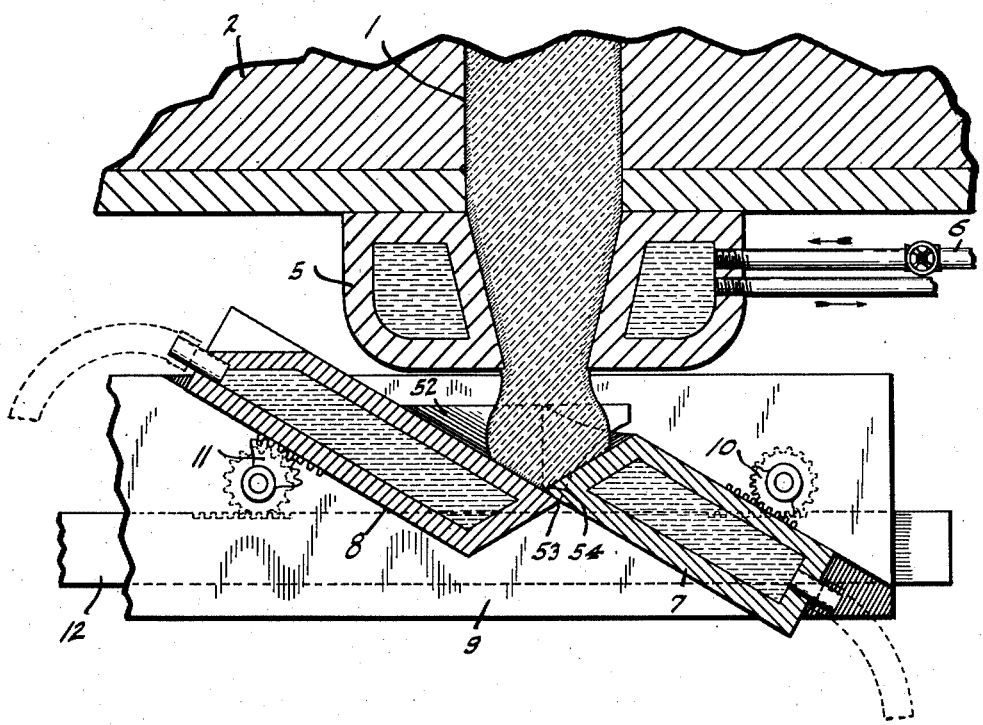

In the drawings which form a part of this specification, Figure 1 illustrates in cross-section one arrangement of cut-off and delivery mechanism suitable for the practice of my invention; Fig. 2 illustrates in plan view an arrangement of molds or other receptacles, and pressing and blowing mechanisms operated therewith which may be provided for the reception and treatment of the individual cut-off batch or masses of glass; Figs. 3 and 4 are detail views illustrating the action of the cut-off and delivery mechanism; Fig. 5 is a similar view showing a slight modification in the construction and arrangement of the cut-off parts; Fig. 6 a sectional view of the glass stream on a larger scale, illustrating diagrammatically the condition of the stream shortly after it has been cut; Fig. 7 a perspective view of a desirable form of cuttters; Fig. 8 a perspective view of a modified form of cutters.

In the practice of my invention I preferably supply the molten glass to the cut-off and delivery parts of the apparatus through an opening 1 in the bottom block of a "dog house" extension or flow block chamber 2 which projects from the front of the melting furnace or main tank 3 in which the supply of molten material is prepared for use. The temperature in the flow block chamber is subject to local regulation and control by means of a burner 4 which enters one side of this chamber, and may be used, if necessary, to heat the glass contained therein somewhat above the temperature of the glass in the main portion of the furnace. I prefer however to keep the temperature of the molten material at just as low a point as will permit it to flow properly through the opening 1 in the bottom block. At the lower end of this opening I provide a water cooled ring or nozzle 5 of cast iron or other metal having a central opening somewhat smaller than the opening 1 and maintained at such a temperature by the flowing water entering through the pipe 6, as to form a skin or sheath of partially congealed glass around the circumference of the opening in the ring 5 and extending slightly below the lower edge of this opening, as shown by the heavy shaded portion in Fig. 6. This congealed skin or sheath of glass itself forms a non-conducting tube or guard through which the hotter glass flows downwardly without coming in contact with the surfaces of the iron of the ring block 5. By varying the temperature and the flow of water through the opening in this block the thickness of the congealed glass sheath may be varied to a considerable extent and the temperature of the flowing glass also varied to some extent; these two actions operating conjointly to vary the volume and rate of flow of the molten material. Further variation in such volume or rate of flow may be secured, if desired, by varying the size of the opening in block 5. Just below the lower or out-let surface of this block I arrange two reciprocating cut-off blades 7 and 8 which move in slides mounted on the L-shaped bracket 9. As shown in Figs. 1, 5 and 6, these cut-off blades are arranged to move at an angle to the central line of the downwardly flowing stream of glass issuing from the opening in the block 5, and the angle of the cutting edges of these blades is such that when the said blades are brought together they form—as shown in Figs. 3 and 6—a conoidal pocket with symmetrically disposed sides for the reception and support of the cut-off end of the glass stream. The cutters may be varied in form to a considerable extent, but it is desirable to have the lower end of the stream approximate, as closely as possible, the lower end of the receiving mold by the time this end of the stream reaches the lower end of the mold. It is preferable, therefore, to make the upper face of cutter 8 trough-like, as shown at 52, the cutting end notched, as shown at 53. Cutter 7 may then be semi-cylindrical, or cylindrical, as shown in Fig. 7, with its cutting end notched as indicated at 54, so that, when the cutters have been overlapped they will form a conoidal or pyramidal pocket for the reception of the swelling lower end of the glass stream. This arrangement of the cut-off blades at an angle to the horizontal, and the disposal of the cutting edges at corresponding angles to the horizontal, so as to form the symmetrical receiving pocket just referred to, constitute one of the features of my invention, the advantages of which will be hereafter more fully referred to. The two cutting blades 7 and 8 are actuated simultaneously in their opening and closing movements by any suitable mechanical means, such, for example, as the rack and pinion mechanism shown in Fig. 6. This mechanism comprises two pinions 10 and 11 which are mounted on shafts extending across the lower member of the L-shaped frame 9 and engage respectively with racks on the blades 7 and 8. These pinions are themselves rotated simultaneously in the same direction —and in so rotating move the blades 7 and 8 in opposite directions—by means of pinions at the outer ends of the cross shafts which are engaged in turn by the reciprocating rack bar 12; the latter being moved at the required intervals of cut-off by any suitable means, as, for example, by the cam 13. The pinions 10 and 11 are preferably made of different size so as to move the two cut-off blades 7 and 8 at varying speed; the object of this arrangement being to bring the edge of the lower cut-off blade 7 to the central line of the downwardly flowing stream at the same time that the opposite edge of the upper cut-off blade 8 has been brought to the overlapping cut-off position shown in Figs. 3, 5 and 6.

The bracket 9 on which the cut off blades are mounted is supported in slides 14 on the front wall of the flow block chamber and can be adjusted and clamped in any desired position by means of a screw 15 and bolts 16. This enables me to place the plane of the cut off blades 7 and 8 at any desired vertical distance below the face of the delivery opening in the block 5. The adjustment of this vertical distance and the resultant location of the plane of the cut off knives at a predetermined point below the flow block orifice—determined by the diameter of the glass stream and the physical conditions of the molten material—constitute another important feature of my invention, for I have discovered that when the temperature of a flowing stream of glass is properly regulated and the said stream is cut at a short distance below the delivery orifice from which it issues the flow of the molten material will momentarily be arrested, and the cut off stream or mass between the orifice and the plane of cut will remain practically stationary save for a slight lateral enlargement or swelling out such as is indicated to an exaggerated degree in Figs. 3 and 6. By adjusting the plane of the cut off up and down until this condition is secured, all lapping or folding over and piling up of the cut off end of the stream upon itself—such as occurs when the flowing stream is cut at some distance below the point of discharge and which is a very fruitful source of difficulty in ordinary flowing stream methods—can be completely avoided and a greatly improved mode of operation can be obtained. When the cut off blades are opened, as in Fig. 4, the enlarged "gob" or mass of glass 17 which has been resting on and between the symmetrically disposed closed shear blades 7 and 8, drops downward between the blades as shown in that figure—or by dotted lines in Fig. 5—in a homogeneous and unstratified mass, free from any "laps" or "chords" or entrained air bubbles and blisters; and the flow of clean undisturbed glass from the orifice in the block 5 is resumed and continuous until the shear blades are once more closed by their actuating mechanism. This mechanism is preferably of such a character that both the opening and closing movements are performed as rapidly as possible— as for example by the special design of cam 13 of Fig. 1—so as to obtain a sharp clean cutting action on closing and a quick clean discharge on opening; and the shear blades may, if desired, be water cooled although—owing to the self supporting action of the cut off stream when severed at the point and in the manner above described—this is far less necessary in the practice of my improved method than it is in the practice of the ordinary flowing stream methods of cutting out and delivering individual molten masses or batches to glass machines.

The supply and cut off mechanism—comprising the water-cooled discharge orifice block 5, the inclined reverse beveled shear blades 7 and 8 placed close below said block and coöperating when closed to form a symmetrical conoidal pocket for the reception of the cut off stream, and the reciprocating mechanism by which these blades are moved—symmetrically with relation to the stream—may be mounted as a whole on the wall or walls of the flow block chamber, as shown in Fig. 1 and used to supply a series of individual batches or masses of molten glass to any form of glass machine requiring such a series of individually delivered molten masses for its operation. It is for this reason that I have shown the parts above referred to as mounted independently of any particular glass machine, but it will be readily understood that all of these parts, save the water-cooled flow block 5 may be supported on the frame of the glass machine instead of on the walls of the flow block chamber.

In the arrangement illustrated in Fig. 1 the glass is shown as being supplied to one of the molds 60 of a pressing and blowing machine similar in general respects to the ones used in the manufacture of fruit jars or wide mouth bottles, the details of which, however, differ materially from former machines, and form the subject matter of a co-pending application.

As I have before explained the size of the flowing stream of glass may be varied to a considerable extent by varying the flow of cooling water through the hollow delivery plate 5, and thereby varying both the thickness of the chilled or congealed skin on the outside of the glass stream and also to some extent the temperature of the flowing glass itself. The rate of flow can also be varied by varying the temperature of the body of glass in the flow block chamber 2. If desired the flow can be further varied by altering the size of the orifice in the delivery plate or block 5 in any suitable manner, as, for example, by using adjustable gates. But I prefer to maintain the orifice in the block 5 at a uniform size, and regulate the volume of glass in each cut off mass as far as possible by varying the thickness of the skin at the edge of the delivery orifice in the manner above described. If such regulation, together with the regulation of the temperature in the flow block chamber, is not sufficient to maintain the cut-off masses at predetermined uniform volume, I maintain that uniformity by regulation of the speed of the operation as a whole. It is of course understood that in this operation the mechanism which operates the cut-off blades is connected to and operated synchronously with, the mechanism which actuates the mold carriers. In order to alter the volume of the cut-off masses deposited in successive molds, it is, therefore, only necessary to either accelerate or retard the speed of the driving motor by which the connected mechanism as a whole is operated. For this purpose a controlling rheostat may be used when the apparatus is driven by an electric motor, or some simple form of accelerating or retarding differential gears may be used when the apparatus is driven by a belt from a line shaft revolving at constant speed.

It will now be obvious to those skilled in the art that various detail modifications of construction in the delivery, in the cut-off, and in the mold actuating parts may be made without departing from the spirit of my invention. For example, the angle of the cut-off blades and their inclination to the horizontal may be varied through a considerable range—as illustrated for example in Fig. 5—it being only desirable that the angles of the cutting edges of these blades be made substantially twice as great as the angle at which these blades are inclined to the horizontal, so that when the blades are closed there will be formed in each case a symmetrically disposed conoidal or pyramidal pocket, the sides of which are equally inclined to the axis of the glass stream. The angles employed in any case will be determined to some extent by the form and character of the mold in which the glass is to be deposited and subsequently molded to shape.

Throughout the description and claims, which form this specification, the terms "molten glass," "glass," and "molten material" are used, and intended to be used, as generally descriptive of that comparatively limited class of material rendered plastic by heat but which do not, in the ordinary commercial manipulation thereof at least, reach such condition of fluidity as to be capable of splashing but, instead, remain viscous and somewhat dough-like in character, glass being probably the most characteristic of these materials and the one most commonly commercially manipulated in that condition. The mechanism disclosed herein forms the subject-matter of Patent No. 1,241,795, issued on my application, October 2, 1917.

Having now described my invention in sufficient detail to enable those skilled in the art to readily understand it, I claim:

1. That improvement in the art of glass working, which comprises the delivering of a depending free column of molten glass from an orifice communicating with a source of supply; the cutting of the column below the orifice; the early subsequent interference with the downward flow of the depending column above the cutting plane in such manner that the downward flow of the interior of the column will be greater than the downward flow of the exterior of the column and will result in a lateral swelling of the column; and the discontinuance of such interference to permit the resumption of normal flow of the column.

2. That improvement in the art of glass working, which comprises the delivery of a depending free column of molten glass from an orifice communicating with a source of supply; the cutting of the column below the orifice; and substantially at the time of cutting arresting the downward movement of the column as a whole and supporting it at a point so situated with respect to the orifice that the column is caused to swell laterally by continued outflow in the center of the column.

3. That improvement in the art of glass working, which comprises the delivering of a depending free column of molten glass from an orifice communicating with a source of supply; the cutting of the column below the orifice; the early subsequent interference with the downward flow of the depending column above the cutting plane in such manner that the downward flow of the interior of the column will be greater than the downward flow of the exterior of the column and will result in a lateral swelling of the column; the discontinuance of such interference to permit the resumption of normal flow of the column; and the variation of rate of delivery by varying the thickness of the chilled skin associated with the orifice.

4. That improvement in the art of glass working, which comprises the delivery of a depending free column of molten glass from an orifice communicating with a source of supply; the cutting of the column below the orifice; and substantially at the time of cutting arresting the downward movement of the column as a whole and supporting it at a point so situated with respect to the orifice that the column is caused to swell laterally by continued outflow in the center of the column; and the variation of rate of delivery by varying the thickness of the chilled skin associated with the orifice.

5. That improvement in the art of glass working, which comprises the delivering of a depending free column of molten glass from an orifice communicating with a source of supply; the cutting of the column below the orifice; the early subsequent interference with the downward flow of the depending column above the cutting plane in such manner that the downward flow of the interior of the column will be greater than the downward flow of the exterior of the column and will result in a lateral swelling of the column; the discontinuance of such interference to permit the resumption of normal flow of the column; and the variation of rate of delivery by varying the thickness of the chilled skin associated with the orifice by varying the heat absorptiveness of the medium adjacent the orifice.

6. That improvement in the art of glass working, which comprises the delivery of a depending free column of molten glass from an orifice communicating with a source of supply; the cutting of the column below the orifice; and substantially at the time of cutting arresting the downward movement of the column as a whole and supporting it at a point so situated with respect to the orifice that the column is caused to swell laterally by continued outflow in the center of the column; and the variation of rate of delivery by varying the thickness of the chilled skin associated with the orifice by varying the heat absorptiveness of the medium adjacent the orifice.

7. That improvement in the art of glass working which comprises the delivery of a depending stream of glass from an outlet passage, the establishment of a tubular skin encircling the glass stream and lining a portion of the outlet passage, and the variation of the thickness of said skin to thereby vary the rate of outflow of the stream.

8. That improvement in the art of glass working which comprises the delivery of a depending stream of glass from an outlet passage, the establishment of a tubular skin encircling the glass stream and lining a portion of the outlet passage, and the variation of the thickness of said skin by varying the absorption of heat externally from said skin to thereby vary the rate of outflow of the stream.

9. That improvement in the art of glass working, which comprises the establishment of a downwardly flowing stream of glass, the intermittent cutting of said stream at a point below the upper end thereof, and the external chilling of the freshly produced lower end of said stream below but in conjunction with the chilled skin depending from the orifice sufficient to momentarily retard the downflow of said stream immediately following a cutting.

10. That improvement in the art of glass working, which comprises the establishment of a downwardly flowing stream of glass into a receptacle, the cutting of said stream at a point below but closely adjacent the upper end of said stream, and the symmetrical external chilling of the freshly produced end of said stream below but in conjunction with the chilled skin depending from the orifice sufficiently to momentarily retard the downflow of the stream immediately following a cutting, the withdrawal of said cutting means, and the withdrawal of the filled receptacle and presentation of a new receptacle in the line of stream flow in time to receive the stream.

11. That improvement in the art of glass working, which comprises the establishment of a stream of glass normally flowing from a source of supply, the cutting of said stream adjacent the source of said stream so as to leave an exposed portion of the stream, and the temporary application to said exposed stream end of a chilling element serving to produce, below but in conjunction with the chilled skin depending from the orifice a temporarily-chilled flow-retarding envelop for said stream immediately following a cutting.

12. That improvement in the art of glass working, which comprises the delivery of a stream of glass from a supply of molten material, and the successive cutting of said stream at a point slightly distant from the source of supply, the momentary chilling of the exterior of the stream from the cutting plane upwardly to form a flow-checking envelop for said stream, and the withdrawal of the cutting and envelop-producing means from said stream.

13. That improvement in the art of glass working, which comprises the establishment of a downwardly flowing stream of molten glass, and the successive cutting of said stream in a plane slightly below the delivery orifice in such manner as to form a flow-retarding stream-incasing envelop suspended from the orifice and serving, until heated and softened by the internal heat of the stream, to substantially arrest the delivery of the stream.

14. That improvement in the art of glass working, which comprises the establishment of a flowing stream of molten glass laterally unsupported beyond the delivery orifice, the application thereto of cutting and shaping members serving to cut the stream beyond the delivery orifice and to form a stream-incasing and flow-arresting chilled envelop attached to the orifice, the withdrawal of said cutting and shaping means and the maintenance of sufficient pressure at the supply end of the stream whereby said envelop is ultimately heated distended and ruptured to permit reëstablishment of stream flow shortly following each cutting action.

In witness whereof, I have hereunto set my hand at Indianapolis, Indiana, this fourteenth day of February, A. D. one thousand nine hundred and thirteen.

FRANK L. O. WADSWORTH.

Witnesses:
ARTHUR M. HOOD,
FRANK A. FAHLE.